US012619999B2

(12) United States Patent　　　　(10) Patent No.:　US 12,619,999 B2

MacLaughlin　　　　　　　　　　　(45) Date of Patent:　　　May 5, 2026

(54) PREDICTIVE AND INTERVENTIVE INTELLIGENCE

(71) Applicant: DeLorean Artificial Intelligence, Inc., Palm Beach, FL (US)

(72) Inventor: Severence M. MacLaughlin, Palm Beach, FL (US)

(73) Assignee: DeLorean Artificial Intelligence, Inc., Palm Beach, FL (US)

( * ) Notice: Subject to any disclaimer, the term of this patent is extended or adjusted under 35 U.S.C. 154(b) by 0 days.

(21) Appl. No.: 17/999,045

(22) PCT Filed: May 26, 2020

(86) PCT No.: PCT/US2020/034561

§ 371 (c)(1),
(2) Date: Nov. 16, 2022

(87) PCT Pub. No.: WO2021/242223

PCT Pub. Date: Dec. 2, 2021

(65) Prior Publication Data

US 2023/0177537 A1　　Jun. 8, 2023

(51) Int. Cl.
　*G06Q 30/0202*　　(2023.01)
　*G06F 16/21*　　(2019.01)
　　　　　(Continued)

(52) U.S. Cl.
　CPC ....... *G06Q 30/0202* (2013.01); *G06F 16/219* (2019.01); *G06F 16/244* (2019.01); *G06Q 30/0201* (2013.01)

(58) Field of Classification Search
　CPC ............ G06Q 30/0202; G06Q 30/0201; G06F 16/219; G06F 16/244
　See application file for complete search history.

(56) References Cited

U.S. PATENT DOCUMENTS 5,966,126 A * 10/1999 Szabo ................... G06F 16/338
　　　　　　　　　　　　　　　　707/E17.082
8,548,937 B2　10/2013 Saigal et al.
　　　　　　　(Continued)

FOREIGN PATENT DOCUMENTS

CN　　　105022740 A　　11/2015
CN　　　106096657 A　　11/2016
　　　　　　　(Continued)

OTHER PUBLICATIONS

Artificial Intelligence-Enhanced Predictive Insights for Advancing Financial Inclusion: A Human-Centric AI-Thinking Approach Meng-Leong How; Sin-Mei Cheah; Khor, Aik Cheow; Chan, Yong Jiet. Big Data and Cognitive Computing4.2: 8. MDPI AG.(2020).*
(Continued)

*Primary Examiner* — Timothy Padot
(74) *Attorney, Agent, or Firm* — Pillsbury Winthrop Shaw Pittman LLP

(57)　　　　　　ABSTRACT

A method includes receiving historical data housed in the one or more computer systems, the historical data including structured data and unstructured data, storing the historical data in a central database, aggregating the historical data in the central database according to subject matter, validating the aggregated historical data, analyzing the validated aggregated historical data using a series of tools, generating normal profiles in the first computer system from the analyzed validated aggregated historical data, storing the generated normal profiles as horizon data sets, receiving real time data housed in the one or more computer systems, comparing the real time data to the horizon data sets to identify normal and out of normal profiles, and generating rules-based, predictive and interventive outcomes for out of normal profiles based on parameters for investigation.

14 Claims, 6 Drawing Sheets

(51) Int. Cl.
  *G06F 16/242* (2019.01)
  *G06Q 30/0201* (2023.01)

(56) References Cited

U.S. PATENT DOCUMENTS

| | | | |
|---|---|---|---|
| 10,483,003 | B1 | 11/2019 | McNair et al. |
| 11,093,880 | B2 | 8/2021 | Anderson et al. |
| 11,093,884 | B2 | 8/2021 | Devarakonda et al. |
| 11,210,300 | B2 | 12/2021 | Ignatyev |
| 11,282,022 | B2 | 3/2022 | Devarakonda et al. |
| 11,514,379 | B2 | 11/2022 | Adrian et al. |
| 11,581,092 | B1 | 2/2023 | McNair et al. |
| 11,723,560 | B2 | 8/2023 | Constantin et al. |
| 2002/0143635 | A1 | 10/2002 | Goodwin, III |
| 2005/0234761 | A1 | 10/2005 | Pinto et al. |
| 2006/0085408 | A1* | 4/2006 | Morsa ............... G06Q 30/02 705/14.71 |
| 2006/0190310 | A1 | 8/2006 | Gudla et al. |
| 2007/0043609 | A1 | 2/2007 | Imam |
| 2007/0043611 | A1* | 2/2007 | Newman ........... G06Q 30/02 705/14.44 |
| 2007/0112704 | A1* | 5/2007 | Tomkins ........... G06Q 10/10 706/21 |
| 2007/0288297 | A1 | 12/2007 | Karras et al. |
| 2010/0010878 | A1* | 1/2010 | Pinto ............... G06Q 10/067 706/11 |
| 2011/0270646 | A1 | 11/2011 | Prasanna et al. |
| 2011/0295783 | A1* | 12/2011 | Zhao ............... G06F 16/337 706/12 |
| 2012/0059779 | A1 | 3/2012 | Syed et al. |
| 2012/0284213 | A1 | 11/2012 | Lin et al. |
| 2013/0151311 | A1* | 6/2013 | Smallwood ......... G06Q 10/40 705/7.31 |
| 2014/0081738 | A1 | 3/2014 | Abraham |
| 2014/0101143 | A1* | 4/2014 | Zhang ......... G06Q 10/063114 707/723 |
| 2014/0372351 | A1* | 12/2014 | Sun ............... G06F 16/353 706/12 |
| 2015/0100356 | A1 | 4/2015 | Bessler |
| 2015/0149237 | A1 | 5/2015 | Brock |
| 2016/0063506 | A1 | 3/2016 | Hicks |
| 2016/0239808 | A1* | 8/2016 | Ryu ............... G06Q 10/1093 |
| 2018/0060744 | A1* | 3/2018 | Achin ............... G06N 20/00 |
| 2018/0218247 | A1 | 8/2018 | Lee et al. |
| 2018/0315141 | A1* | 11/2018 | Hunn ............... G06F 9/547 |
| 2019/0116265 | A1 | 4/2019 | Avila et al. |
| 2019/0130425 | A1 | 5/2019 | Lei et al. |
| 2019/0139054 | A1 | 5/2019 | Mathrubootham et al. |
| 2019/0259043 | A1 | 8/2019 | Koneri et al. |
| 2019/0378074 | A1 | 12/2019 | Mcphatter et al. |
| 2020/0184417 | A1 | 6/2020 | Rosenfeld et al. |
| 2020/0293946 | A1 | 9/2020 | Sachan et al. |
| 2021/0014136 | A1 | 1/2021 | Rath |
| 2021/0049700 | A1 | 2/2021 | Nguyen |
| 2021/0202103 | A1 | 7/2021 | Bostic et al. |
| 2021/0310075 | A1 | 10/2021 | Maher et al. |
| 2021/0343411 | A1 | 11/2021 | Zhang et al. |
| 2021/0390498 | A1 | 12/2021 | Ohlsson et al. |
| 2022/0172257 | A1 | 6/2022 | Mustafi |
| 2022/0263731 | A1 | 8/2022 | Gupta et al. |
| 2022/0358514 | A1 | 11/2022 | Duff |
| 2023/0119881 | A1 | 4/2023 | Makhija |
| 2023/0177516 | A1 | 6/2023 | He |
| 2023/0177537 | A1 | 6/2023 | MacLaughlin |
| 2023/0267370 | A1 | 8/2023 | Copeland |
| 2024/0054447 | A1 | 2/2024 | Kwon |
| 2024/0177841 | A1 | 5/2024 | Mamaghani |
| 2024/0378494 | A1 | 11/2024 | Biswas |
| 2024/0386372 | A1 | 11/2024 | Vanbrocklin |
| 2025/0181592 | A1 | 6/2025 | Khan |
| 2025/0181602 | A1 | 6/2025 | Khan |

FOREIGN PATENT DOCUMENTS

| | | |
|---|---|---|
| CN | 107515898 A | 12/2017 |
| CN | 108520045 A | 9/2018 |
| JP | 2007-141036 A | 6/2007 |
| KR | 10-2018-0029593 A | 3/2018 |
| KR | 10-2020-0099284 A | 8/2020 |
| WO | 2020-163381 A1 | 8/2020 |
| WO | 2020245727 A1 | 12/2020 |

OTHER PUBLICATIONS

P. Ongsulee, V. Chotchaung, E. Bamrungsi and T. Rodcheewit, "Big Data, Predictive Analytics and Machine Learning," 2018 16th International Conference on ICT and Knowledge Engineering (ICT &KE), Bangkok, Thailand, 2018, pp. 1-6.*

"International Search Report and Written Opinion received for PCT Patent Application No. PCT/US2020/034561, mailed on Jul. 28, 2020", 14 pages.

International Search Report and Written Opinion for International Application No. PCT/US2023/080231 dated Aug. 12, 2024, pp. 1-13.

International Search Report and Written Opinion for International Application No. PCT/US2023/080751 dated Aug. 20, 2024, pp. 1-11.

Non-Final Office Action for U.S. Appl. No. 18/516,354 dated Dec. 17, 2024, pages.

"LightGBM", Wikipedia.org, retrieved Nov. 16, 2023, pp. 1-3.

"Logistic regression", Wikipedia.org, retrieved Nov. 16, 2023, pp. 1-30.

"Long short-term memory", Wikipedia.org, retrieved Nov. 16, 2023, pp. 1-14.

"Machine learning", Wikipedia.org, retrieved Nov. 16, 2023, pp. 1-34.

"Naive Bayes classifier", Wikipedia.org, retrieved Nov. 16, 2023, pp. 1-12.

"Random forest", Wikipedia.org, retrieved Nov. 16, 2023, pp. 1-13.

"Support vector machine", Wikipedia.org, retrieved Nov. 16, 2023, pp. 1-13.

"Training, validation, and test data sets", retrieved Nov. 16, 2023, pp. 1-6.

"XGBoost", Wikipedia.org, retrieved Nov. 16, 2023, pp. 1-4.

"Artifical neural network", Wikipedia.org, retrieved Nov. 16, 2023, pp. 1-38.

"Autoregressive model", Wikipedia.org, retrieved Nov. 16, 2023, pp. 1-12.

"BERT (language model)", Wikipedia.org, retrieved Nov. 16, 2023, pp. 1-6.

"CatBoost", Wikipedia.org, retrieved Nov. 16, 2023, pp. 1-3.

"Decision tree learning", Wikipedia.org, retrieved Nov. 16, 2023, pp. 1-12.

"Decomposition of time series", Wikipedia.org, retrieved Nov. 16, 2023, pp. 1-3.

"Deep learning", Wikipedia.org, retrieved Nov. 16, 2023, pp. 1-45.

"Ensemble learning", Wikipedia.org, retrieved Nov. 16, 2023, pp. 1-15.

"Feedforward neural network", Wikipedia. org, retrieved Nov. 16, 2023, pp. 1-7.

"Gated recurrent unit", Wikipedia.org, retrieved Nov. 16, 2023, pp. 1-4.

"Gradient boosting", Wikipedia.org, retrieved Nov. 16, 2023, pp. 1-10.

"k-nearest neighbors algorithm", Wikipedia.org, retrieved Nov. 16, 2023, pp. 1-11.

"Cluster analysis", Wikipedia.org, retrieved Nov. 20, 2023, pp. 1-22.

Final Office Action for U.S. Appl. No. 17/999,045 dated Feb. 12, 2025, pp. 1-29.

Extended European Search Report received for European Application No. 20938380.1, mailed on Nov. 30, 2023, pp. 1-5.

Non-Final Office Action for related U.S. Appl. No. 17/999,045 dated Jul. 2, 2024, pp. 1-44.

(56) References Cited

OTHER PUBLICATIONS

Artificial Intelligence—Enhanced Predictive Insights for Advancing Financial Inclusion: A Human-Centric AI-Thinking ApproachMeng-Leong How; Sin-Mei Cheah; Khor, Aik Cheow; Chan, Yong Jiet. Big Data and Cognitive Computing4.2:8. MDPI AG (2020), 13 pages.

International Search Report and Written Opinion received for PCT Patent Application No. PCT/US2023/076284, mailed on Jul. 2, 2024, pp. 1-13.

Office Action for Chinese Application No. 202080101992.0 dated Feb. 26, 2025, pp. 1-9.

International Search Report and Written Opinion for Int'l Application No. PCT/US2024/039962 dated Apr. 14, 2025, pp. 1-14.

Non-Final Office Action for U.S. Appl. No. 18/482,741 dated May 19, 2025, pp. 1-97.

Final Office Action for U.S. Appl. No. 18/516,354 dated Jun. 9, 2025, pp. 1-20.

Li, Dan, et al. "Machine learning-aided risk stratification system for the prediction of coronary artery disease." International Journal of Cardiology 326 (2021): 30-34. (Year: 2021).

Office Action for Chinese application No. 202080101992.0 dated Jul. 30, 2025, pp. 1-9.

Non-Final Office Action for U.S. Appl. No. 18/786,540 dated Sep. 11, 2025, pp. 1-48.

Non-Final Office Action for U.S. Appl. No. 18/753,896 dated Dec. 16, 2025, pp. 1-43.

* cited by examiner

<u>100</u>

Receive historical data housed in the one or more interconnected computer systems
in a first computer system, the historical data comprising structured data and unstructured data
<u>102</u>

Store the historical data in a central database residing in the first computer system in the
network
<u>104</u>

Aggregate the historical data in the central database
in the first computer system according to subject matter
<u>106</u>

Validate the aggregated historical data in the first computer system;
<u>108</u>

Analyze the validated aggregated historical data in the first
computer system using a series of data science tools;
<u>110</u>

Generate norm profiles in the first computer system
from the analyzed validated aggregated historical data;
<u>112</u>

Store the generated norm profiles as horizon data sets;
<u>114</u>

Receive real time data housed in the one or more of the
interconnected computer systems in the first computer system;
<u>116</u>

Compare the real time data to the horizon data sets to
identify normal and out of normal profiles;
<u>118</u>

Generate rules-based and or predictive outcomes for normal profiles and
out-of-normal profiles based on risk, financial, operations, quality
and other business or industry parameters for investigation
<u>120</u>

Introduce a normal or out of normal profile into a theoretical scenario
<u>122</u>

Use the introduced norm profile to predict a probable outcome of the theoretical scenario
<u>124</u>

FIG. 3

PREDICTIVE AND INTERVENTIVE INTELLIGENCE

BACKGROUND OF THE INVENTION

The present invention relates generally to data modeling, and more particularly to predictive and interventive intelligence.

In general, businesses today are looking for smarter ways to streamline their existing sales operations process and improve conversion rates. For example, businesses look to chase opportunities that have higher changes of conversion and profitability, shorten sales cycles without compromising conversion odds, and reducing cost of winning deals and ongoing operations.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a method including receiving historical data housed in the one or more interconnected computer systems in a first computer system, the historical data comprising structured data and unstructured data, storing the historical data in a central database residing in the first computer system in the network, aggregating the historical data in the central database in the first computer system according to subject matter, validating the aggregated historical data in the first computer system, analyzing the validated aggregated historical data in the first computer system using a series of tools, generating normal profiles in the first computer system from the analyzed validated aggregated historical data, storing the generated normal profiles as horizon data sets, receiving real time data housed in the one or more of the interconnected computer systems in the first computer system, comparing the real time data to the horizon data sets to identify normal and out of normal profiles, and generating rules-based outcomes for out of normal profiles based on parameters for investigation.

In another aspect, the invention features a system including a processor, a memory, a data store, the memory including an operating system and a predictive process, the predictive process including receiving historical data housed in one or more interconnected computer systems, the historical data comprising structured data and unstructured data, storing the historical data in the data store, aggregating the historical data in the data store according to subject matter, validating the aggregated historical data, analyzing the validated aggregated historical data using a series of tools, generating normal profiles from the analyzed validated aggregated historical data, storing the generated normal profiles as horizon data sets, receiving real time data from the one or more of the interconnected computer systems, comparing the real time data to the horizon data sets to identify normal and out of normal profiles, and generating rules-based outcomes for out of normal profiles based on parameters for investigation.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

FIG. 3 is a flow diagram.

DETAILED DESCRIPTION

Figure 1:
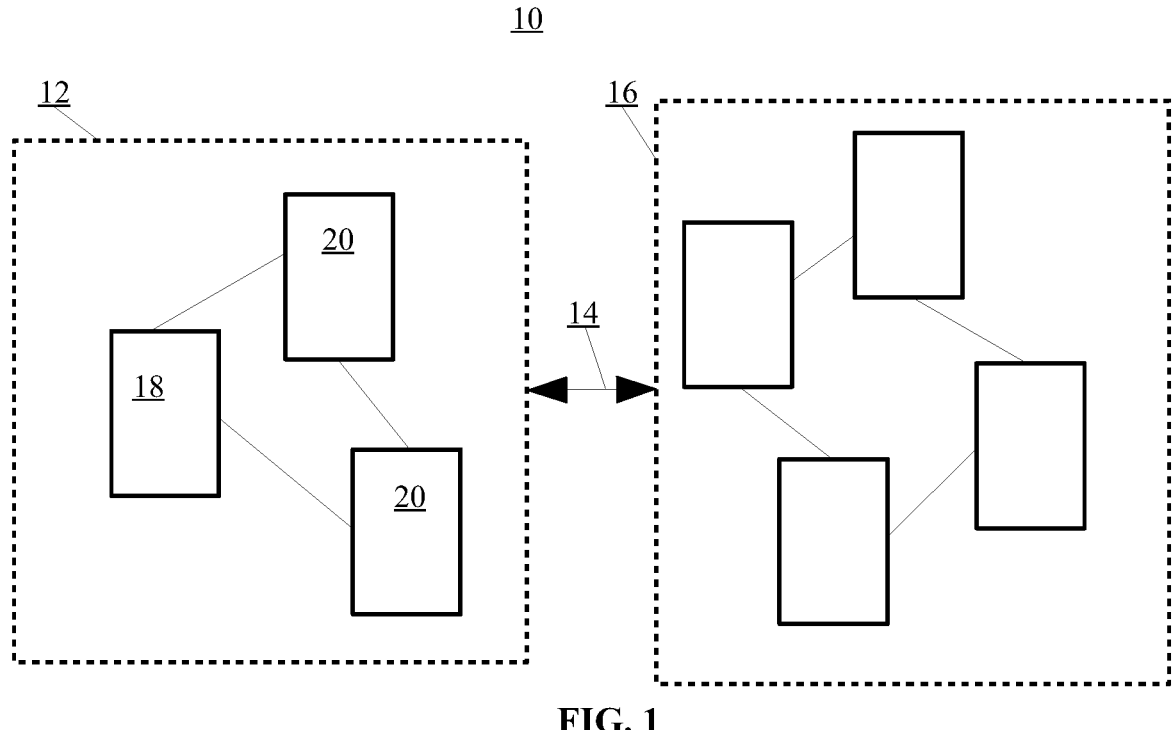
FIG. 1 is a block diagram of an exemplary network.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As shown in FIG. 1, an exemplary network 10 includes a local area network (LAN) 12 and a link 14 to network 16 of interconnected computers (e.g., Internet). The LAN 12 includes one of more server systems 18, 20 and 22. Although only three servers 18, 20, 22 are shown, the LAN 12 may include any number of servers. The servers 18, 20, 22 are all linked to each other using wired and/or wireless communication. In the example shown, server 18 communicates with the network 16 of interconnected computers over link 14. The link 14 may be wired and/or wireless.

Each of the server systems 18, 20, 22 and each of the interconnected computers in the network 16 include at least a processor, a memory and a datastore. The datastore may include a repository of public and/or private information.

Figure 2:
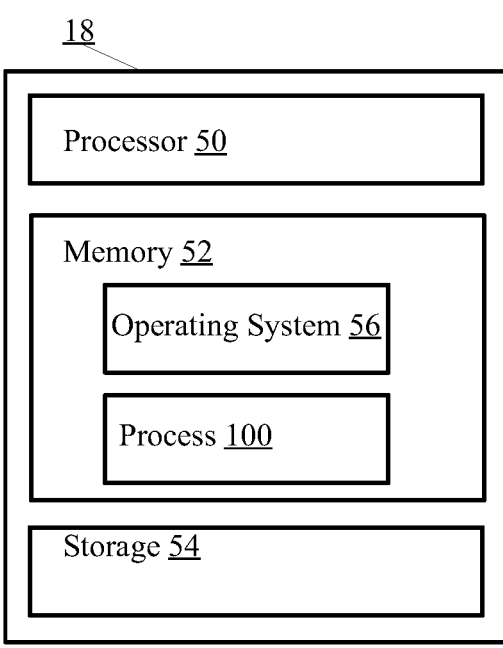
FIG. 2 is a block diagram of an exemplary server.

As shown in FIG. 2, the server system 18, for example, includes a processor 50, a memory 52 and a storage unit 54. The memory 52 includes at least an operating system (OS) 56, such as Windows®, Unix® or Linux®, and a predictive process 100, fully described below.

As shown in FIG. 3, predictive process 100 includes receiving (102) historical data housed in the one or more interconnected computer systems in a first computer system. Receiving (102) may include, for example, acquiring historical data. The interconnected computer systems may include, for example, cloud systems, data marts, data lakes, smart data lakes, data oceans and so forth. The historical data may also include data received from additional computer systems linked to the network.

The received data may include, for example, structured data and unstructured data. In general, structured data is data that resides in a fixed field within a record or file. In general, unstructured data is data that does not have a pre-defined data model or is not organized in a pre-defined manner.

The received data may include, for example, internal and external data. Further, when the N is large enough 'thick' data can be incorporated. External data can be purchased or "harvested," meaning that it is scraped from the digitized universe.

Predictive process 100 stores (104) the historical data in a central database residing in the first computer system in the network. In other embodiments, the historical data may be stored (104) in, for example, a cloud systems, a data mart, a data lake, a smart data lake, a data oceans and so forth.

Predictive process 100 aggregates (106) the historical data in the central database in the first computer system. Aggregating (106) permits multiple data sources referencing one subject to be analyzed.

Predictive process 100 validates (108) the aggregated historical data in the first computer system.

Predictive process 100 analyzes (110) the validated aggregated historical data in the first computer system using a series of analytic, artificial intelligence or data science tools. The analytic, artificial intelligence or data science tools may include but not limited to one of more of text mining, natural language processing (NLP), natural language utilization (NLU), natural language generation (NLG), machine learning (e.g., supervised and unsupervised), genetic programming, evolutionary programming, deep learning, neural networks, computer vision, and audio sound recognition.

Predictive process 100 generates (112) normal profiles in the first computer system from the analyzed validated aggregated historical data. The normal profiles represent mathematical models of potential groups that may be defined by mathematical patterns, repeatable behaviors, characteristics, pathways, common variables, causal events, risk or return on investment (ROI) clusters, and so forth. The normal profiles may include sub-profiles, such as, for example, customers in New York, Connecticut and Massachusetts.

Predictive process 100 stores (114) storing (114) the generated normal profiles as historical horizon data sets. The historical horizon data sets represent profiles of a target industry, such as, for example, consumers, patients, physicians, salespersons, sales deals, and so forth.

Predictive process 100 receives (116) real time data housed in the one or more of the interconnected computer systems in the first computer system. Real time data may be different for various industries. For example, in the financial services trading, real time is milliseconds, for the pharmaceutical industry real time is daily, and for the fashion industry trends, real time is quarterly. Here we consider real time data to be decision time data. Decision time data is data that is analyzed and quantified to generate insights and predictions based on a need of an industry and or a client and a speed of which data can be acquired and ingested.

Predictive process 100 compares (118) the real time data to the historical horizon data sets to identify normal and out of normal profiles.

Predictive process 100 generates (120) rules-based and or predictive outcomes for normal profiles and out-of-normal profiles based on risk, financial, operations, quality and other business or industry parameters for investigation.

Predictive process 100 introduces (122) a normal or out of normal profiles into a theoretical scenario and uses (124) the introduced normal profiles to predict a probable outcome of the theoretical scenario. Using (124) the introduced normal profile and/or out of normal profile to predict a probable outcome of the theoretical scenario may include matching mathematical profiles of the normal profile to situational event data and variables of the theoretical scenario. Using (124) may include an intervention phase where best actions lead to mitigation, intervention or enhancement of an event and/or probability of a future interaction.

Once process 100 is complete, and one understands the mathematical models of what is normal and what is not normal, one can then use these mathematical models in the historical horizon data set as a "mirror" to compare data that is coming in real/decision time to see if it matches profiles within the normal parameters or whether they fall outside of what is normal. Those profiles that fall outside of the normal mathematical model may then flagged for further analysis. Based on these analyses, process 100 implements rules-based, predictive and/or interventive outcomes based on risk parameters for investigation, utilizing robotic processing automation (RPA) and/or other technologies and analyses. These profiles can be shunted to either a predetermined outcome based on lower risk or rules or directly to human intervention. Further, if there is something that falls outside of normal, these profiles are modeled for differences and how those differences could impact the nascent industry parameters to predict what outcomes would happen.

Determining whether an event in the future will happen with a probability is what process 100 can achieve. Once process 100 has a flow through of real time data that is ever expanding the historical horizon data set as well as real time analysis of that data flow, process 100 has the ability to understand and analyze how the mathematical profiles will interact within different types of situational environments that are constructed with theoretical data variables. Process 100 understands how and what a profile is and how it will interact when presented into a situation. Thus, if a profile is introduced into a theoretical scenario, process 100 can predict its outcome with a known probability. The more situational data and the richer the data is, the higher the precision in the validity of the probability.

Process 100 can include attack algorithms, which be analogized to baby hunting dogs. These attack algorithms are raised in a sand box and trained to "hunt" or identify a specific mathematical profile, just as a hunting puppy is trained to learn a smell of prey. Once the attack algorithms are trained, they can be released to the digitized universe and when they identify the mathematical profile that they are trained to recognize, then they red flag identification and trigger a prediction or analyses.

Another analogy to explain an attack algorithm is to think of a profile as a cell with certain cellular membrane proteins that represent variables with data points. The attack algorithm is the antibody that has been developed to identify those proteins and latch onto for identification for the immune system. The immune system in this analogy is process 100. The attack algorithm is basically a highly focused and profile centric advanced WebCrawler/DigiCrawler.

Once an event is predicted to occur in the future, a business or organization can determine if this event is good or bad and whether it will have positive or negative effects to the organization. The interventive phase of process 100 enables an organization to change the probability that the event will occur. If the event is determined to have negative outcomes, the organization can choose to pull levers or take preventative actions in order to mitigate the effect of this event. If the event is positive to operations, then the organization can take steps to enhance the probability of the event.

When process 100 matches mathematical profiles of incoming data to situational event data and variables and determines a probability of an event happening in the future, the situational variables are given weight based on how much that variable contributes to the event happening. The interventive phase is all about how does one pull certain levers or how to change these variables to either mitigate or enhance the future event. In data science and artificial intelligence consulting this is referred to as "next best action." Because process 100 knows what influences the event, process 100 can generate a report detailing what variables are influencing the occurrence and by what weight and prioritize their importance. From this prioritization process 100 can recommend or take actions that will change the outcome of the predicted event.

Figure 4:
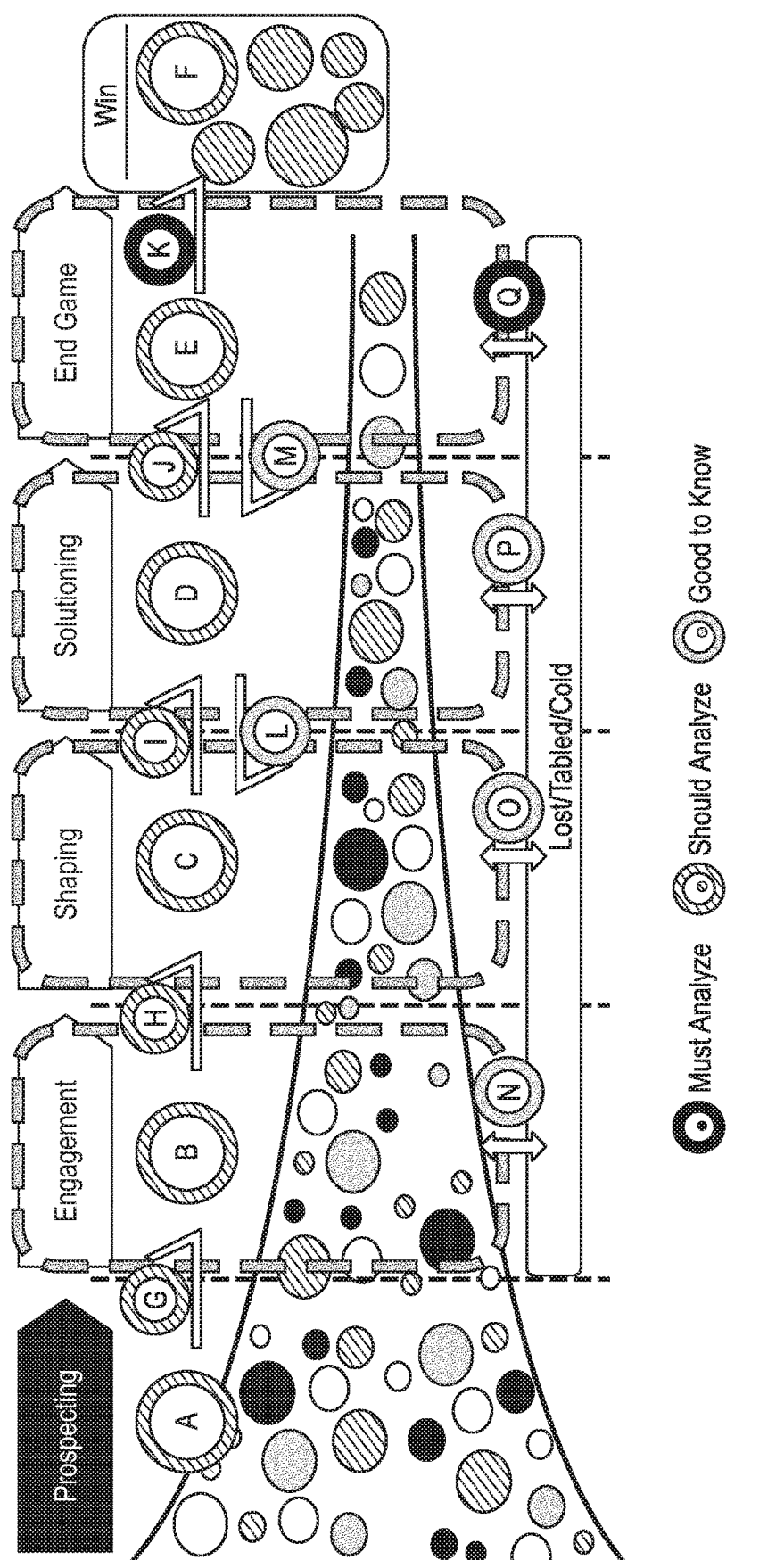
FIG. 4 is a flow diagram.

For example, customer relationship management (CRM) is an approach to managing a company's interaction with current and potential customers. Referring now to FIG. 4, an exemplary sales funnel progression of a CRM is illustrated. Process 100 may be used mathematically model deals that are present in each of the different phases (A to F) as well as the progression forward and backwards between phases of the sales funnel (G to M). Further, process 100 can characterize and model those deals that fail or drop out of the funnel at specific stages (N to Q) and more powerfully the process 100 can determine what is different from those deals that drop out or lose and those that progress to the next stage and eventually win. The categorical and differential delta between those that drop out and those that progress and win produce a list or opportunities for next best action to save those deals or change the approach so that they can move to the next stage in the sales funnel and how those next best actions individually can increase the chances of progression and or win per action item by probability.

As one might imagine, in addition to CRM, predictive process 100 can be used in a number of areas, such as, for example, healthcare, where it can be used in modeling real time medical management, disease progression, claims, payment integrity, and so forth.

Predictive process 100 can be used in customer facing, e.g., how to identify a customer, mathematically model who the customer is, how to contact the customer at the right time, in the right channel (e.g., email, phone, mail, app, and so forth) with the right message to drive conversion, and so forth.

Predictive process 100 can be used to acquire and retain the right customers, especially within loyalty programs.

Predictive process 100 can be used in life sciences, e.g., patient and prescriber identification.

Predictive process 100 can be used in the natural resources and oil and gas industry, e.g., how to identify what fields of natural resources are most profitable and how to develop in the most efficient and profitable manner.

Predictive process 100 can be used with commodity, stock and financial instruments, e.g. to predict price and trading value in future.

By way of one non-limiting example, use of predictive process 100 in a CRM environment is described below.

Figure 5:
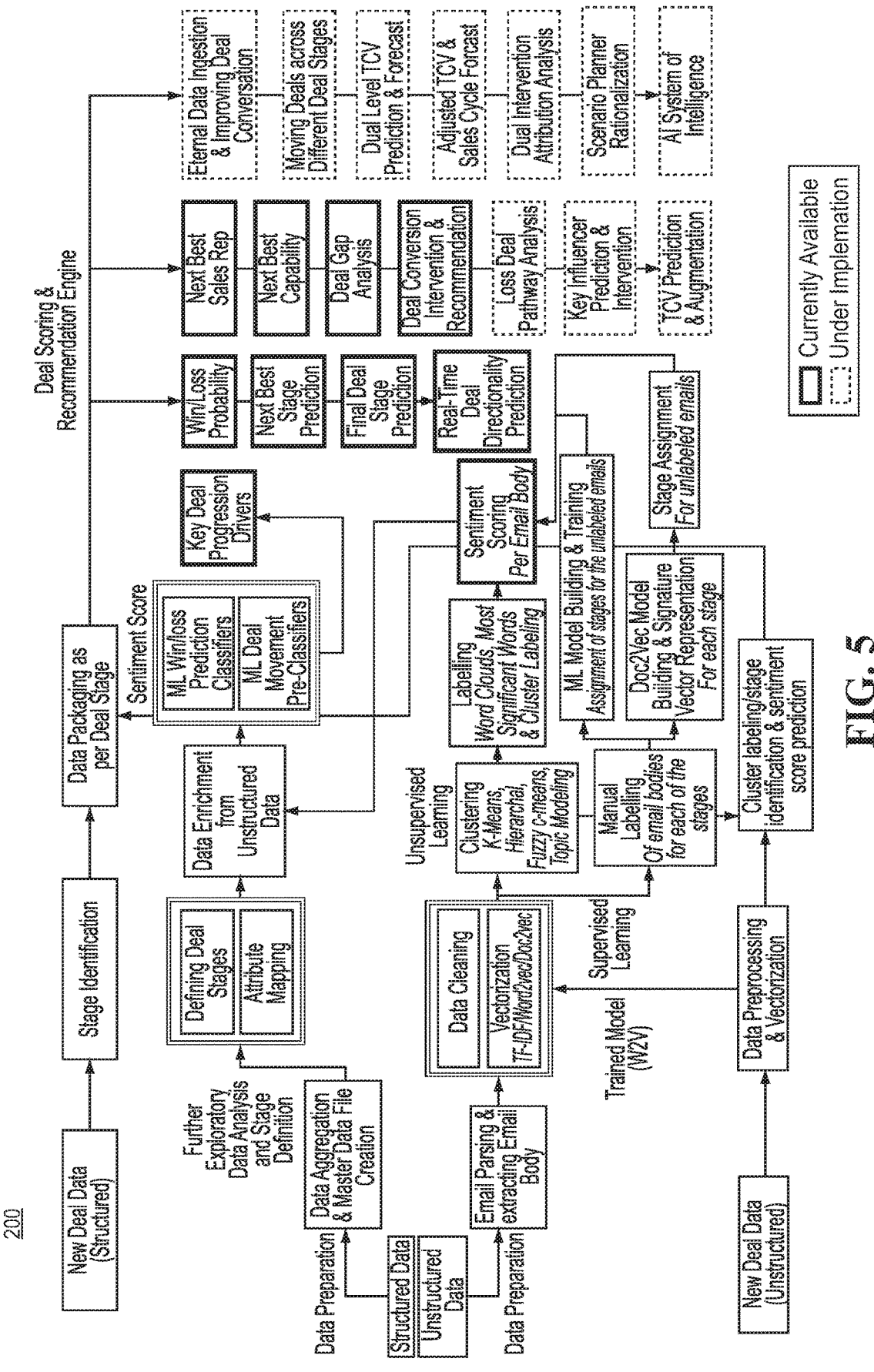
FIG. 5 illustrates an exemplary CRM framework.

As shown in FIG. 5, an exemplary CRM framework 200 is illustrated, which depicts a process from data acquisition through four veins of analysis, i.e., structured data, supervised learning, unsupervised learning and sentiment analysis. The result is a deal win/loss probability, where the deal will fail if it does not win and what next best actions can be taken to increase probability of a win.

Figure 6:
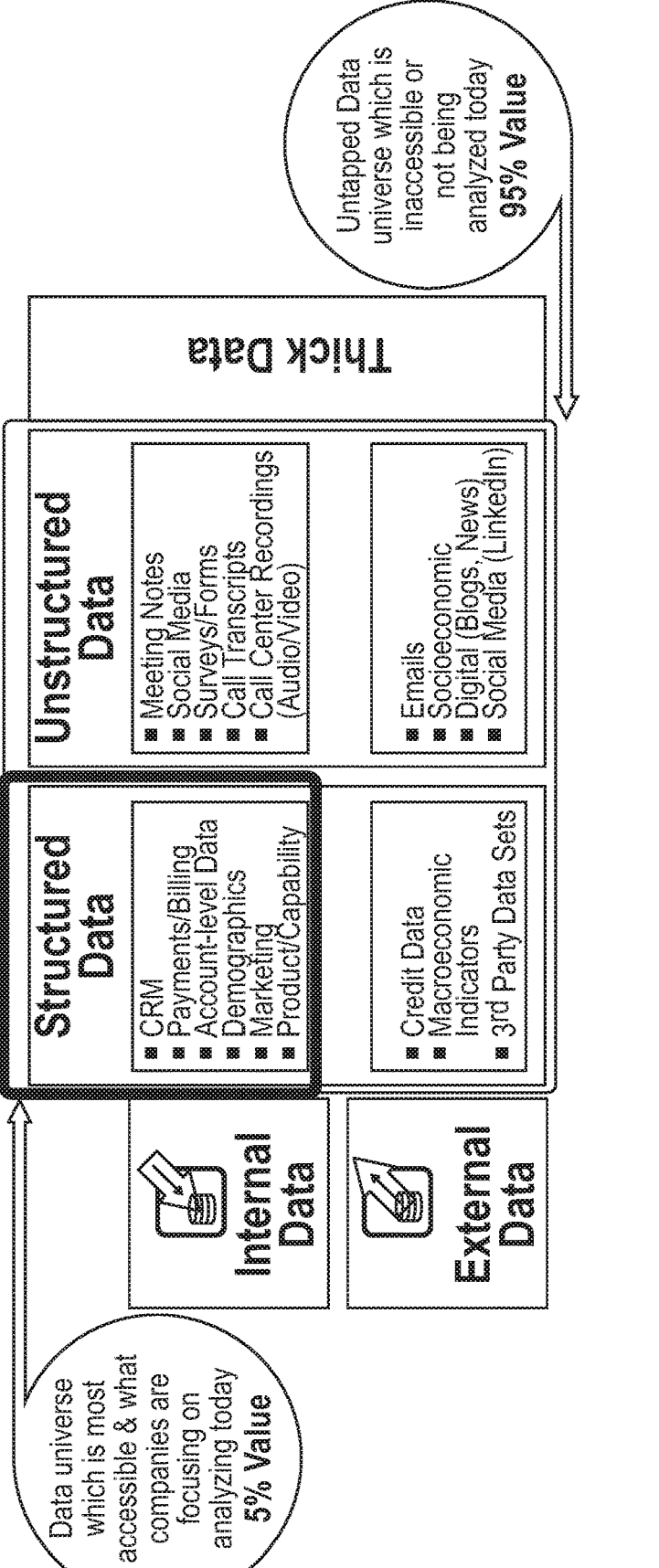
FIG. 6 illustrates some exemplary types of data ingested.

Data is harvested from a backend of a CRM system for both structured and unstructured data. Examples of structured data are client demographics, days in deal, days in stage, salesperson, categorization, and so forth. Structured data is anything entered in a specific header or predetermined field for the CRM basic or customizable. Unstructured data includes but not limited to free text notes in specific fields, meeting notes, follow up notes, meeting invites, acceptances and associated emails, emails pertaining to the deal, uploaded documents, uploaded presentations and any other potential files such as PDF™ files, Excel™ files, and so forth. FIG. 6 illustrates some exemplary types of data ingested. Data is placed in a data base and then analyzed in two veins, i.e., structured and unstructured.

Figure 7:
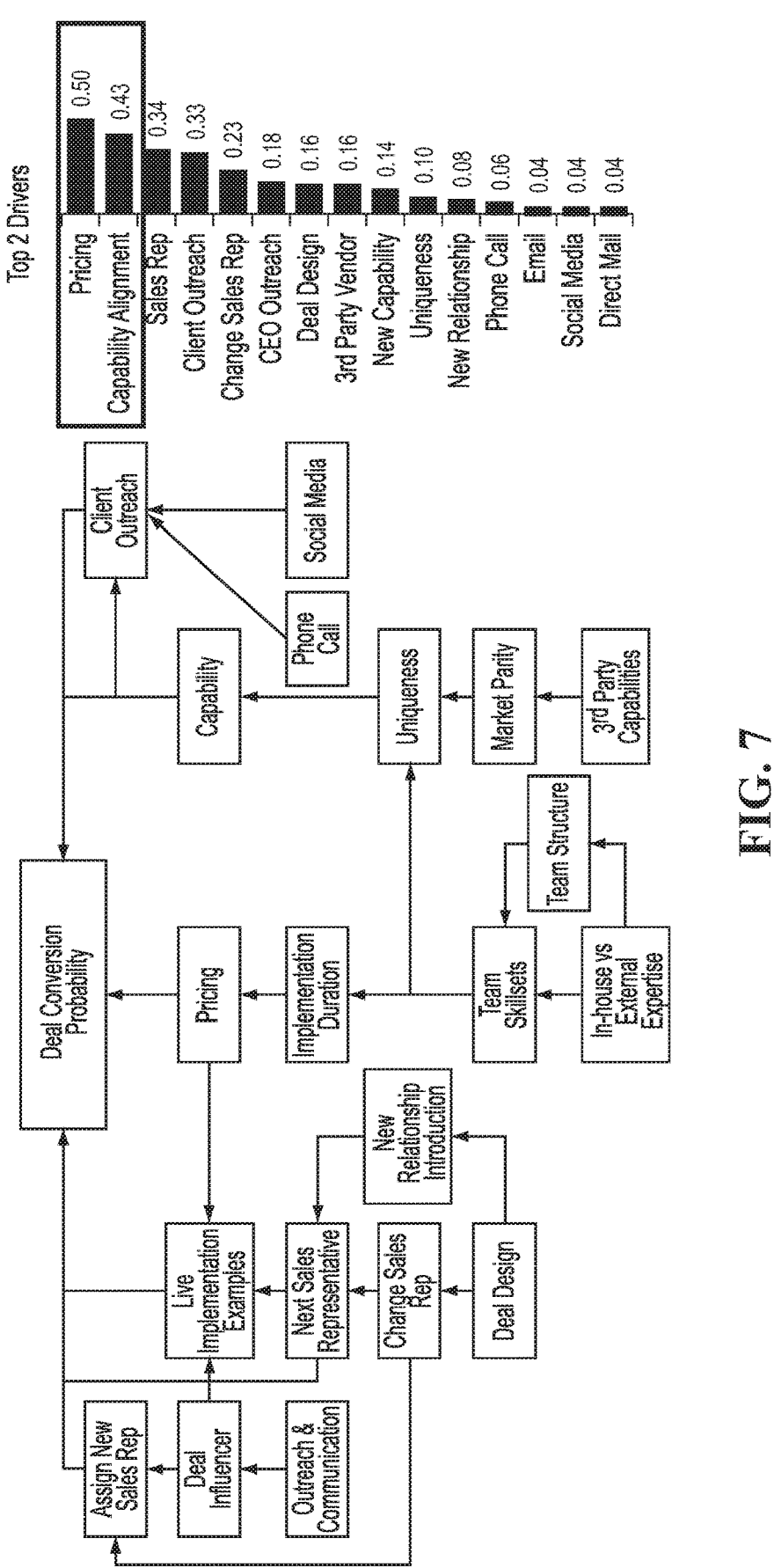
FIG. 7 illustrates an example of next best action.

Structured data is aggregated and a master data file is created. Each phase or stage is mathematically modeled from horizon data. Data is then enriched from unstructured data. Machine learning is used to determine win/loss prediction classifiers. Machine learning is used to determine probability of deal movement classifiers from one stage to the next and in what direction. The Machine learning results in key deal progression drivers and situational data variables, and what next best action to take. An example of next best action is illustrated in FIG. 7 where situational data variables that are weighted in the prediction of deal event in the future and potential next best actions to improve deal win rate and progression through the sales funnel. Attribution modeling helps uncover how different intervention levers come together to drive/increase in overall deal conversion probabilities or deal TCV (directly or indirectly) at a per-deal or at a client/account level.

Unstructured data analysis typical includes three prongs, i.e., unsupervised learning, supervised learning and sentiment analysis. Unstructured data sources such as free text notes, emails and or files are harvested, the unstructured data is then parsed and extracted, data is cleaned and then vectorized. From this point the auto-prepared data is then divided into unsupervised and supervised veins of analysis. The unstructured data is then processed into clusters that are then mathematically modeled per stage and the progression between stages. The result of this process is the ability give a probability based on unstructured text and documents as to what stage in the CRM process the deal is present or transitioning. Once the different stage clusters are mathematically modeled, the unstructured data is analyzed for sentiment analysis. The result determines whether the sentiment of the document and or the emails are positive (win probability) or negative (loss probability). Finally, unstructured data that has been cleansed, parsed and vectorized are labeled based in the unsupervised learning results of the clusters and mathematical models of each sales stage and or transitioning. After this has been achieved a machine learning neural net model is trained based on segmentation and characterization per sales stage and transition phase, which allows for auto-classification and probability referencing of unstructured data as to what phase the deal is currently assigned. The summation of the unsupervised, supervised and sentiment analysis results are fed into the data enrichment of the structured data for further machine learning modeling. The four veins of analysis, i.e., structured, unsupervised learning, supervised learning and sentiment analysis give final results of:

1. Win/Loss Probability
2. Key Deal Progression Drivers
3. Next Best Stage Prediction
4. Final Deal State Prediction
5. Realtime Deal Directionality Prediction
6. Next best sales rep
7. Next best capability
8. Deal gap analysis
9. Deal conversion and intervention/recommendation As described above, the present invention enables predictive modeling of the progression of a customer/deal along the sales funnel by leveraging both the structured and unstructured data.

The present invention identifies the factors controlling the progression of a customer/deal along the sales funnel.

The present invention predicts the end state (target) probabilities of a new customer/deal and up to what stage (along the funnel) a new customer/a new deal can progress (if the target state probabilities are not favorable).

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method of conducting a deal, the method comprising:

receiving, by a first computer system, historical deal data housed in one or more interconnected computer systems, the historical deal data comprising historical structured deal data and historical unstructured deal data;

storing, by the first computer system, the historical deal data in a central database residing in the first computer system in the network;

aggregating, by the first computer system, the historical deal data in the central database in the first computer system according to subject matter to generate aggregated historical deal data;

validating, by the first computer system, the aggregated historical deal data in the first computer system to generate validated-aggregated historical deal data;

analyzing, by the first computer system, the validated-aggregated historical deal data in the first computer system using a series of tools to generate analyzed-validated-aggregated historical deal data;

training, by the first computer system based on the analyzed-validated-aggregated historical deal data, a deal profile model, the training of the deal profile model comprising:

determining, by the first computer system based on the historical unstructured deal data, enrichment data, the determining of enrichment data comprising:

vectorizing the unstructured electronic documents to generate vectorized historical unstructured deal data;

clustering, using unsupervised learning comprising k-means clustering, the vectorized historical unstructured deal data to generate historical unstructured deal data clusters corresponding to clusters of the electronic documents corresponding to stages of the deal;

training, by the first computer system using supervised learning and the vectorized historical unstructured deal data, a stage model configured to determine a current phase of a deal based on unstructured data for the deal, the supervised learning comprising:

labeling the electronic documents of the vectorized historical unstructured deal data to generate labeled documents data; and training a neural network classifier using the historical unstructured deal data clusters and the labeled data, the stage model; and determining sentiments for the electronic documents of the historical unstructured deal data, the enrichment data comprising the historical unstructured deal data clusters, the stage model and the sentiments for the historical unstructured data;

training, by the first computer system, using the historical structured data and the enrichment data, the deal profile model to determine a current deal phase, a predicted deal outcome, and next best action to improve deal outcome based on deal data comprising structured deal data and unstructured deal data;

receiving, by the first computer system, real time data housed in the one or more of the interconnected computer systems in the first computer system, the real time data comprising current deal data comprising current structured deal data and current unstructured deal data for a current deal;

determining, by the first computer system applying to the deal profile model, the current structured deal data and the current unstructured deal data to determine a deal phase of the current deal, a predicted deal outcome of the current deal, and a next best action to improve deal outcome of the current deal, the next best action comprising a set of deal actions that are weighted based on priority to improve the outcome of the current deal; and conducting, by the first computer system responsive to determining the next best action, the set of deal actions prioritized based on the weighting of the set of deal actions to improve an outcome of the current deal.

2. The method of claim 1 wherein the series of tools include one or more of data science tools, analytical tools and artificial intelligence tools.

3. The method of claim 1 wherein receiving historical data further comprises receiving structured and unstructured data from additional computer systems linked to the network.

4. The method of claim 3 wherein the structured data comprises data that resides in a fixed field within a record or file.

5. The method of claim 4 wherein the unstructured data comprises data that does not have a pre-defined data model or is not organized in a pre-defined manner.

6. The method of claim 2 wherein the series tools include one or more of text mining, natural language processing (NLP), natural language utilization (NLU), natural language generation (NLG), machine learning (supervised and unsupervised), genetic programming, evolutionary programming, deep learning, neural networks, computer vision and audio sound recognition.

7. The method of claim 1 wherein real time data is decision time data.

8. The method of claim 7 wherein decision time data comprises data that is analyzed and quantified to generate insights and predictions based on a need of an industry.

9. The method of claim 1 wherein the electronic documents comprise electronic mail documents comprising unstructured text.

10. A system comprising:

a processor;

a memory;

a data store;

the memory comprising instructions that are executable to perform a predictive process, the predictive process comprising:

receiving, by a first computer system, historical deal data housed in one or more interconnected computer systems, the historical deal data comprising historical structured deal data and historical unstructured deal data;

storing, by the first computer system, the historical deal data in the data store;

aggregating, by the first computer system, the historical deal data in the data store according to subject matter to generate aggregated historical deal data;

validating, by the first computer system, the aggregated historical deal data to generate validated-aggregated historical deal data;

analyzing, by the first computer system, the validated aggregated historical deal data using a series of tools to generate analyzed-validated-aggregated historical deal data;

training, by the first computer system, a deal profile model, the training of the deal profile model comprising:

determining, based on the historical unstructured deal data, enrichment data, the determining of enrichment data comprising:

vectorizing the unstructured electronic documents to generate vectorized historical unstructured deal data;

clustering, using unsupervised learning comprising k-means clustering, the vectorized historical unstructured deal data to generate historical unstructured deal data clusters corresponding to clusters of the electronic documents corresponding to stages of the deal;

training, by the first computer system using supervised learning and the vectorized historical unstructured deal data, a stage model configured to determine a current phase of a deal based on unstructured data for the deal, the supervised learning comprising:

labeling the electronic documents of the vectorized historical unstructured deal data to generate labeled documents data; and training a neural network classifier using the historical unstructured deal data clusters and the labeled data, the stage model; and determining sentiments for the electronic documents of the historical unstructured deal data, the enrichment data comprising the historical unstructured deal data clusters, the stage model and the sentiments for the historical unstructured data;

training, by the first computer system, using the historical structured data and the enrichment data, deal profile model to determine a current deal phase, a predicted deal outcome, and next best action to improve deal outcome based on deal data comprising structured deal data and unstructured deal data;

receiving, by the first computer system, real time data from the one or more of the interconnected computer systems, the real time data comprising current deal data comprising current structured deal data and current unstructured deal data for a current deal;

determining, by the first computer system applying to the deal profile model, the current structured deal data and the current unstructured deal data to determine a deal phase of the current deal, a predicted deal outcome of the current deal, and a next best action to improve deal outcome of the current deal, the next best action comprising a set of deal actions that are weighted based on priority to improve the outcome of the current deal; and conducting, by the first computer system responsive to determining the next best action, the set of deal actions prioritized based on the weighting of the set of deal actions to improve an outcome of the current deal.

11. The system of claim 10 wherein the series of tools include one or more of data science tools, analytical tools and artificial intelligence tools.

12. The system of claim 10 wherein the electronic documents comprise electronic mail documents comprising unstructured text.

13. A method of conducting a deal, the method comprising:

obtaining, by a computer system, historical deal data comprising:

historical structured deal data; and historical unstructured deal data;

training, by the computer system based on the deal data, a deal profile model, the training of the deal profile model comprising:

vectorizing, by the computer system, electronic documents of the historical unstructured deal data to generate vectorized historical unstructured deal data;

clustering, by the computer system using unsupervised learning comprising k-means clustering, the vectorized historical unstructured deal data to generate historical unstructured deal data clusters corresponding to clusters of the electronic documents corresponding to stages of the deal;

training, by the computer system using supervised learning, the vectorized historical unstructured deal data, a stage model configured to determine a current phase of a deal based on unstructured data for the deal, the supervised learning comprising:

labeling, by the computer system, the electronic documents of the vectorized historical unstructured deal data to generate labeled documents data;

training, by the computer system, a neural network classifier using the historical unstructured deal data clusters and the labeled data, the stage model; and determining, by the computer system, sentiments for the historical unstructured deal data;

determining, by the computer system, enrichment data comprising:

the historical unstructured deal data clusters;

the stage model; and the sentiments for the historical unstructured data;

training, by the computer system using the historical structured data and the enrichment data, the deal profile model to determine a current deal phase, a predicted deal outcome, and next best action to improve deal outcome based on deal data comprising structured deal data and unstructured deal data;

receiving, by the computer system, current deal data comprising current structured deal data and current unstructured deal data for a current deal;

determining, by the computer system applying to the deal profile model, the current structured deal data and the current unstructured deal data to determine a deal phase of the current deal, a predicted deal outcome of the current deal, and a next best action to improve an outcome of the current deal, the next best action comprising a set of deal actions that are weighted based on priority to improve the outcome of the current deal; and conducting, by the computer system responsive to determining the next best action, the set of deal actions prioritized based on the weighting of the set of deal actions to improve an outcome of the current deal.

14. The method of claim 13 wherein the electronic documents comprise electronic mail documents comprising unstructured text.

\* \* \* \* \*